(12) United States Patent
Bertrand et al.

(10) Patent No.: US 12,275,349 B2
(45) Date of Patent: Apr. 15, 2025

(54) VEHICLE STEERING WHEEL LIGHTING DEVICE (71) Applicant: AUTOLIV DEVELOPMENT AB, Vargarda (SE)

(72) Inventors: Olivier Bertrand, Courcome (FR); Hugues Doursoux, Latillé (FR); Boubacar Sagna, Paris (FR); Pascal Hugaud, Le Mesnil le Roi (FR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/261,623

(22) PCT Filed: Jan. 18, 2022

(86) PCT No.: PCT/EP2022/050943
§ 371 (c)(1),
(2) Date: Jul. 14, 2023

(87) PCT Pub. No.: WO2022/157128
PCT Pub. Date: Jul. 28, 2022

(65) Prior Publication Data
US 2024/0391381 A1  Nov. 28, 2024

(30) Foreign Application Priority Data
Jan. 20, 2021  (FR) ........................................ 2100535

(51) Int. Cl.
B60Q 3/283  (2017.01)
B62D 1/04  (2006.01)
B62D 1/06  (2006.01)

(52) U.S. Cl.
CPC ............. *B60Q 3/283* (2017.02); *B62D 1/046* (2013.01); *B62D 1/06* (2013.01)

(58) Field of Classification Search
CPC ... B62D 1/046; B62D 1/06–065; B60Q 3/283
See application file for complete search history.

(56) References Cited

U.S. PATENT DOCUMENTS

| 6,594,417 | B1 | 7/2003 | Hulse | |
| 6,748,822 | B2 | 6/2004 | Hussy | |
| 9,873,446 | B2 * | 1/2018 | Gardner | B60Q 9/00 |
| 2016/0025281 | A1 | 1/2016 | Gardner et al. | |

FOREIGN PATENT DOCUMENTS

| DE | 102018200591 A1 | 7/2019 |
| FR | 3096940 A1 | 12/2020 |
| JP | 2010241275 A | 10/2010 |
| WO | 2019048538 A1 | 3/2019 |

* cited by examiner

*Primary Examiner* — Jason M Han
(74) *Attorney, Agent, or Firm* — Matthew D. Thayne; Thayne and Davis LLC

(57) ABSTRACT

A lighting device for a vehicle steering wheel rim, comprising: —a plurality of light sources arranged so as to emit light towards an external display wall of the rim, —a holding body comprising an internal wall with an elongate opening having a predetermined passage width to allow the light emitted towards the external display wall to pass through, wherein the lighting device comprises at least one bridging element engaged with the holding body and at least partially arranged on an opposite side of the internal wall from the external, display wall, in order to limit any increase in the predetermined passage width.

15 Claims, 5 Drawing Sheets

VEHICLE STEERING WHEEL LIGHTING DEVICE

TECHNICAL FIELD OF THE INVENTION

The present invention generally relates to a lighting device mounted in a steering wheel rim of a motor vehicle.

STATE OF THE ART

Lighting devices installed in a steering wheel rim are known in the prior art. Document WO2019048538A1 discloses a lighting device installed in the rim of a steering wheel. On the other hand, the system has recessed plastic parts and this document does not propose a solution to prevent these parts from deforming. It is important to limit deformations because this causes visual defects (gaps, openings, unevenness, etc.) or tactile defects (bumps, misshapen parts, etc.) which are to be avoided for such an aesthetic component.

The document US20160025281(A1) discloses a steering wheel rim having a lighting device with a carrier part elastically fitted or clipped onto an armature. The document JP2010241275(A) discloses a steering wheel rim having a lighting device with a U-shaped external light diffuser engaged with a holding body.

DISCLOSURE OF THE INVENTION

One aim of the present invention is to address the disadvantages of the prior art mentioned above and in particular, first of all, to propose a lighting device for a steering wheel rim, which limits or eliminates the risks of causing appearance defects in the steering wheel.

For this, a first aspect of the invention therefore relates to a lighting device for a vehicle steering wheel rim comprising:
- a plurality of light sources, arranged to emit light towards an external display wall of the rim
- a holding body, comprising an internal wall with an elongate opening having a predetermined passage width to allow the light emitted towards the external display wall to pass through, characterized in that the lighting device comprises at least one bridging element engaged with the holding body and at least partially arranged on an opposite side of the internal wall from the external display wall, in order to limit any increase in the predetermined passage width.

According to the above implementation, the opening provided in the holding body allows the light from the light sources to pass towards the vehicle user. In addition, the bridging element provides a reinforcement that connects the two sides of the passage opening to prevent it from opening or widening, in particular during a subsequent operation of manufacturing the steering wheel or during the use of the steering wheel by the driver. Thus, the presence of the elongate opening does not cause weakening of the structure of the holding body, which eliminates the variations in geometry of the holding body in the rim of the steering wheel.

In other words, the invention may relate to a lighting device for a vehicle steering wheel rim, comprising:
- a holding body,
- at least one, preferably a plurality of light sources attached to the holding body,
the holding body comprising at least one elongate opening having a predetermined passage width and arranged to allow the light emitted by the light sources to pass through towards an external display wall of the rim, characterized in that the lighting device comprises at least one bridging element engaged with the holding body, in order to limit an increase of the predetermined passage width during a subsequent assembly operation carried out on the rim.

In other words, the invention may relate to a lighting device for a vehicle steering wheel rim, comprising:
- a holding body,
- a plurality of light sources attached to the holding body, the holding body comprising at least one elongate opening having a predetermined passage width and arranged so to allow the light emitted by the light sources to pass through an internal wall of the holding body towards an external display wall of the rim, characterized in that the lighting device comprises at least one bridging element engaged with the holding body from a side of the internal wall that is opposite the external display wall, in order to limit any increase in the predetermined passage width.

According to one embodiment, the bridging element may be interconnected, or may be embedded with the holding body. There are therefore parts embedded in each other between the bridging element and the holding body, so that the assembly is robust. In other words, at least one wall and/or one protruding element of one of the bridging element or the holding body at least partially penetrates into a receiving cavity or wall of the other of the bridging element or the holding body.

According to one embodiment, the holding body may be formed of a single piece. This limits the risks of deformations and can reduce tolerances.

According to one embodiment, the bridging element may be a light guide. The bridging element may have at least one portion that is crossed by the light of the light sources.

According to one embodiment, the lighting device may comprise a plurality of bridging elements. For example, a first bridging element can be provided in the form of a printed circuit board and a second bridging element in the form of a light guide.

According to one embodiment, the bridging element can be directly arranged at the internal wall. The bridging element may be directly in contact with the internal wall or directly connected thereto; there may be only one component that ensures bridging.

According to one embodiment, the light sources may each have a light-emitting surface arranged in the same emitting plane, wherein the bridging element may have a connecting portion opposite the elongate opening, arranged in the emitting plane and/or on one side of the emitting plane opposite the external display wall. According to this embodiment, the connecting portion, which extends opposite and transversely to the elongate opening, is at the same level as the light sources or on a side opposite the external wall, which means that the connecting portion is not on the optical path and does not disturb the path of the light.

According to one embodiment, the bridging element may have a connecting portion opposite the elongate opening, and at least one light source is arranged between the bridging element and the elongate opening.

According to one embodiment, the bridging element may have a connecting portion opposite the elongate opening, and the connecting portion can be arranged opposite at least one light source, and:
- the connecting portion can be arranged between said light source and the external display wall, and the connecting portion can be transparent, or wherein:

said light source may be arranged between the external display wall and the connecting portion, and the connecting portion is preferably opaque.

According to the above implementation, the connecting portion, arranged opposite and transversely to the elongate opening, is transparent if it might fall within the optical path to the user, or can be opaque if it does not risk being located on the optical path to the user. Typically, the connecting portion may be a part of a light guide if it is located on the optical path towards the user or may be a support of the light sources such as a printed circuit if it does not run the risk of falling with the optical path to the user.

According to one embodiment, the elongate opening may have a length greater than ten times the width of the elongate opening, preferably thirty times, more preferentially forty times and very preferentially fifty times.

According to one embodiment, the bridging element is arranged between the two longitudinal ends of the elongate opening, preferably in a portion in the middle of the elongate opening, and/or preferably at a distance from each longitudinal end by at least a quarter of the length of the elongate opening.

According to one embodiment, the lighting device may comprise a printed circuit supporting the plurality of light sources, wherein the bridging element can be formed by the printed circuit. According to the above implementation, the printed circuit, typically a rigid component, combines the function of supporting the light sources, and provides the bridging of the elongate opening effectively, due to its intrinsic rigidity.

According to one embodiment, the lighting device may comprise a light diffuser or screen forming the external display wall, wherein the bridging element can be formed by the light diffuser or screen. According to the above implementation, the light diffuser or screen effectively provides the bridging above the elongate opening thanks to significant rigidity.

According to one embodiment, the rim may comprise an outer sheath, and the bridging element can be engaged with the holding body in a sheath-free zone.

According to one embodiment, the holding body can serve as a support or part for holding the sheath. Typically, the holding body can receive and hold flaps of the sheath.

According to one embodiment, the elongate opening may have a passage length, and the holding body may be free of stiffening rib in the passage length direction. The bridging element alone ensures the reinforcement function at the elongate opening. In other words, the holding body comprises a smooth wall wherein the elongate opening is provided. Thus, it is possible to propose a thin, long lighting device capable of diffusing a continuous light. Indeed, transverse ribs on the path of the light would necessarily lead to complex shadow areas that would need to be masked.

According to one embodiment, the elongate opening may be continuous and/or the holding body may be free of ribs or bars transverse to the elongate opening and/or opposite the elongate opening. The bridging element alone ensures the reinforcement function at the elongate opening. In other words, the holding body comprises a smooth wall wherein the elongate opening is provided. In particular, the opening and/or the internal wall lacks raised edges at the opening edge. The internal wall, at the elongate opening is flat and has only one wall thickness at this level. In particular, provision may be made for the internal wall to be substantially perpendicular to the path of the light.

According to one embodiment, at least one of the holding body or the bridging element may comprise a protrusion passing through a wall of the other of the holding body or of the bridging element. The protrusion may be an stud, a tab, preferably cylindrical or with a draft angle, a column, etc. The protrusion may be formed in a single-piece or integral manner with the holding body or the bridging element, but may also be an added or assembled part.

According to one embodiment, at least one of the holding body or the bridging element may comprise a welded portion passing through the other of the holding body or of the bridging element. Thermal, laser or ultrasound welding may be considered. Bonding may also be considered.

According to one embodiment, at least one of the holding body or the bridging element may comprise a portion embedded in the other of the holding body or of the bridging element. It is possible to provide an embedding with counter-forms, a Tee groove, or a dovetail groove, etc.

According to one embodiment, at least one of the holding body or the bridging element may comprise a plastically deformed and/or plastically folded and/or headed portion passing through the other of the holding body or of the bridging element. Such deformation may be obtained by riveting or hot deformation to seal the assemblies.

According to one embodiment, at least one of the holding body or the bridging element may comprise a portion overmolded onto the other of the holding body or of the bridging element.

A second aspect of the invention relates to a vehicle steering wheel comprising a lighting device according to the first aspect.

A third aspect of the invention relates to a motor vehicle comprising a lighting device according to the first aspect.

Another aspect relates to a manufacturing method, wherein a step of mounting or assembling the bridging element can be carried out on the lighting device, and/or on the lighting device alone, and/or before the mounting of the lighting device on the steering wheel, and/or before the fastening of the holding body to the steering wheel, and/or before a step of sheathing the steering wheel. Preferably, the bridging element can be secured, attached, engaged with the holding body before manufacturing or assembly forces on the steering wheel are applied to the holding body. According to this aspect, the bridging element is attached to the holding body or to the internal wall as early as possible in the manufacturing steps, and in any case before applying significant forces to the holding body that could deform the elongate opening.

DESCRIPTION OF THE FIGURES

Other features and advantages of the present disclosure will become more apparent upon reading the following detailed description of embodiments of the disclosure, which are provided by way of non-limiting examples and illustrated by the attached drawings, wherein.

DETAILED DESCRIPTION OF EMBODIMENT(S)

Figure 1:
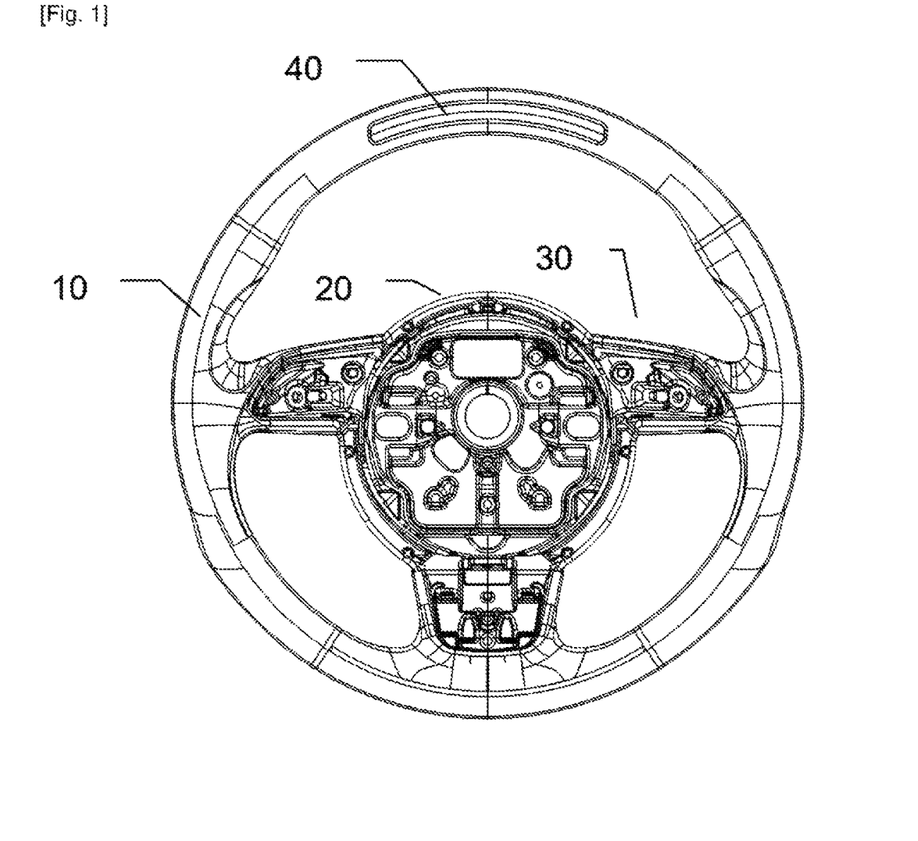
FIG. 1 shows a front view of a steering wheel comprising a lighting device in the rim.

FIG. 1 shows a vehicle steering wheel that typically comprises a rim 10 connected to a hub 20 by a plurality of branches 30. The rim 10 is equipped in the upper position, called the "12-o'clock" position, with a lighting device 40. This lighting device 40 has an external display wall that extends along the rim over an angular sector of about 30° to 40°, but a greater or lesser angular extent can be provided, up to 180° or even more for example.

Figure 2:
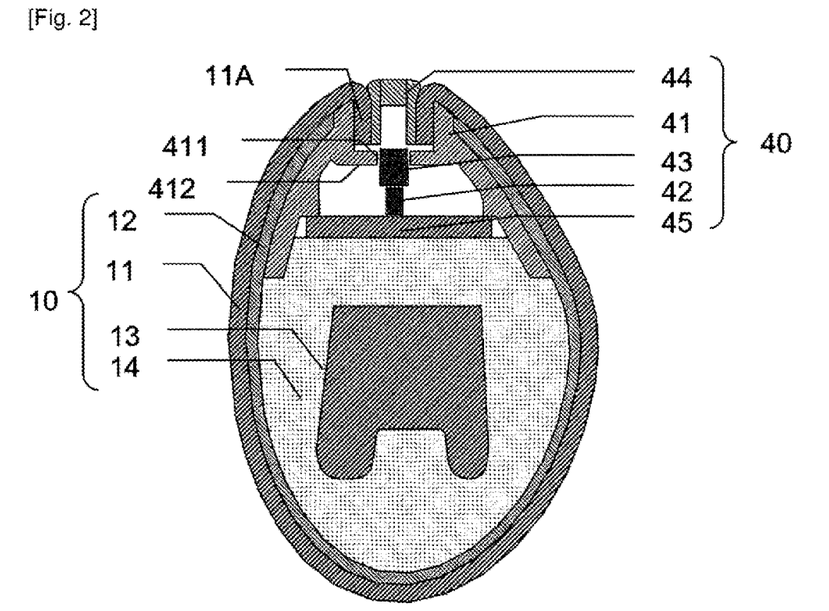
FIG. 2 shows a cross-section of the rim at the lighting device with a light source arranged to diffuse light towards an occupant of the vehicle through an elongate opening of the lighting device.

FIG. 2 shows a cross-section of the rim 10 of FIG. 1, and the rim typically comprises:

- an armature 13 (or framework), for example made of magnesium,
- a foam or packing material 14, for example polyurethane, overmolded on the framework 13,
- an electrical or electronic apparatus 12, for example a contact detection sensor, or a heating sheath, (it is understood that such an electrical apparatus is an accessory and can be omitted),
- a sheath 11, which forms an external skin of the rim, made of leather, for example.

The lighting device itself comprises:

- a printed circuit 45,
- light sources 42 (light-emitting diodes for example), mounted on the printed circuit 45,
- a holding body 41, on which the printed circuit is attached, and which also serves as a support for the electrical or electronic apparatus 12 and for the sheath 11, in particular at flaps 11A of the sheath 11,
- a light guide 43,
- a diffuser screen 44.

It is possible to provide:

- the light guide 43 and the diffuser screen 44 made of transparent polymer, for example polycarbonate or polymethyl methacrylate (PMMA),
- the holding body 41 made of rigid polymer and easily moldable by injection, such as polyamide, preferably charged with glass fibers for example,
- the printed circuit made of resin with fibers, such as for example an epoxy resin with glass fibers.

The holding body 41 therefore forms a surface continuity with the foam material 14 to receive the electrical or electronic apparatus 12 and the sheath 11, which are typically mounted once the lighting device is assembled and mounted on the steering wheel. The upper part of the holding body even forms a groove that receives the flaps 11A of the sheath 11, and then the diffuser screen 44. At the bottom of this groove, an elongate opening 411 is formed in an internal wall 412.

The light sources 42 are all located in the same plane defined by the printed circuit 45, and opposite the light guide 43, itself engaged in the elongate opening 411 provided in the internal wall 412, to guide the light from the light sources 42 towards the diffuser screen 44.

As stated above, and visible in FIG. 2, the holding body 41 serves as a support for the sheath 11, which is directly visible and held by the driver of the vehicle. It is therefore important for the geometry to be precise to avoid any visual or tactile defect. In addition, it is obviously also important to not have an opening or port between the diffuser screen 44 and the flaps 11A.

To this end, it is necessary to guarantee that the holding body does not deform. However, as also seen above, the elongate opening 411 is formed in the smooth internal wall 412, and can extend over the entire angular sector of the rim covered by the lighting device. In order not to cause variations in luminosity, it is important to provide an elongate continuous opening 411, without transverse ribs. Longitudinal ribs on the edges of the elongate opening 411 on the side of the diffuser screen 44 are not desirable either, to minimize the opening in the rim visible to the driver.

Such an elongate opening 411 can weaken the holding body and can lead to a separation or opening of the elongate opening, in particular for example due to the flaps 11A which can exert a separation force, in particular during the placement of the sheath 11 which must be taut, once the lighting device is assembled and mounted on the rim 10.

Figure 3:
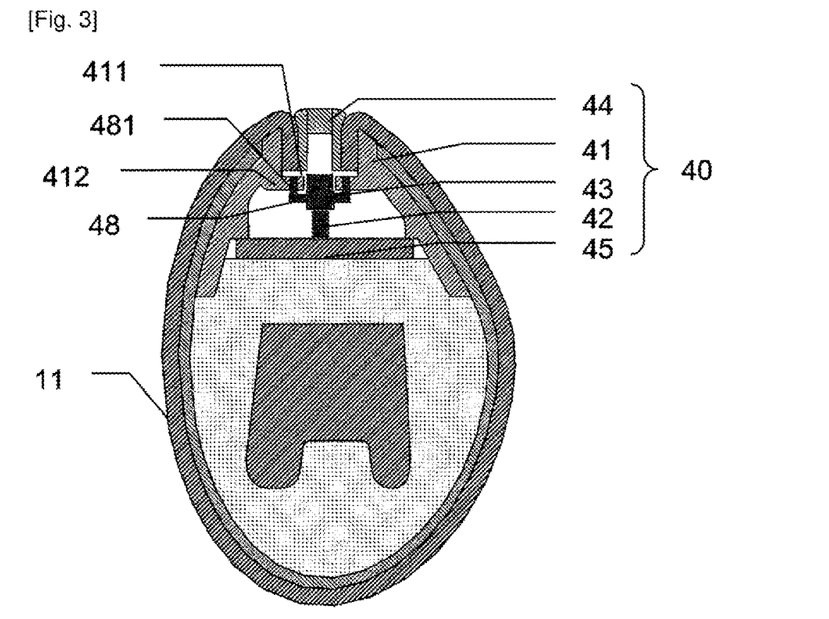
FIG. 3 shows the cross-section of FIG. 2, at an implementation of a bridging element arranged between two edges of the elongate opening.

To counter this possibility of separating the edges of the elongate opening 411, it is proposed to provide a bridging element 48 at the elongate opening 411, as shown in FIG. 3, which is a cross-section of the rim 10 precisely at the bridging element 48.

Indeed, the light guide 43, in this embodiment, comprises two studs 481 connected by arms to the rest of the body of the light guide 43, and the two studs 481 are each engaged in the internal wall 412 of the holding body. Consequently, the bridging element provides a rigid link between the two edges of the elongate opening 411 which can no longer open during subsequent manufacturing operations, even if tension forces, traction are applied (typically during the sheathing). Thus, its width is guaranteed, and the size of the rim 10 and the absence of an opening between the diffuser screen 44 and the flaps 11A are ensured without taking up space in the upper part of the device.

In the above embodiment, the bridging element 48 is formed by the studs 481 and the part of the body of the light guide 43 where the studs 481 are anchored, and is between the external surface and the light sources 42. The bridging element 48, and at least the connecting portion opposite or overlapping the elongate opening 411, is transparent, so as not to disrupt the diffusion of light towards the driver.

In the above embodiment, the bridging element 48 is formed by the studs 481, and it is possible to provide a length for the studs 481 so that they protrude from the internal wall 412, then to deform them (hot or by riveting or heading) and obtain a permanent connection.

Alternatively, flexible tabs can be provided with a hook at the end of the studs 481 to provide resilient interlocking.

Figure 4:
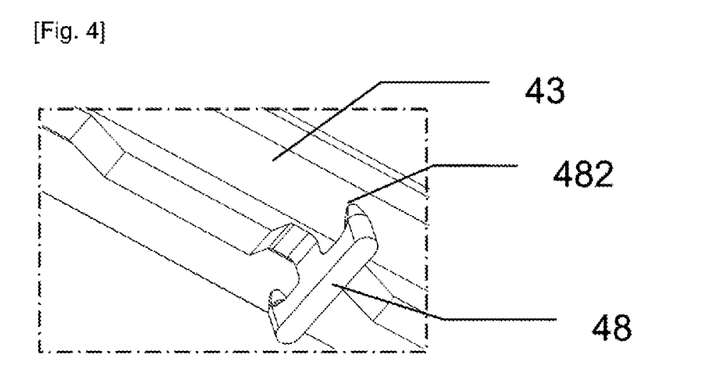
FIG. 4 shows a particular implementation of the bridging element of FIG. 2.

FIG. 4 shows an alternative of the connecting element 48, with, instead of the studs 481 which pass through the internal wall 412, welding pins 482, intended to allow ultrasonic welding of the light guide 43 on the internal wall 412. Here again, the bridging element 48 is formed on the transparent light guide, and connects the two edges of the elongate opening 411.

Figure 5:
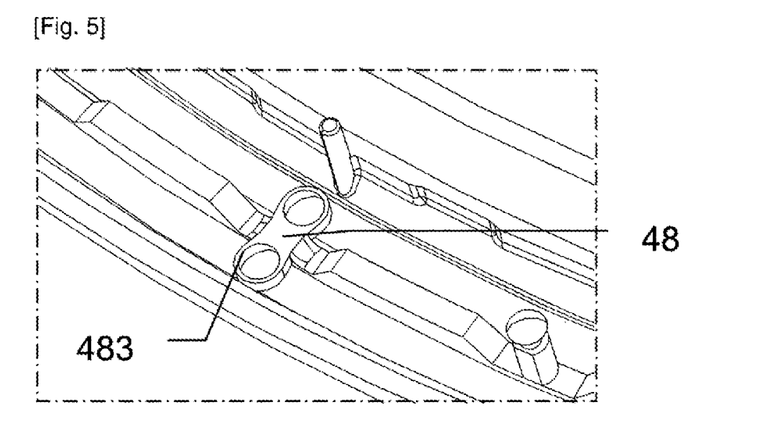
FIG. 5 shows another particular implementation of the bridging element of FIG. 2.

FIG. 5 shows another alternative of the bridging element 48, here with two holes 483 which can receive pins or studs that protrude on the lower face of the internal wall 412. In this embodiment, it is possible to provide a length for the pins or studs that protrude so that they extend beyond holes 483, then deform them (hot or by riveting or heading) and obtain a permanent connection.

Figure 6:
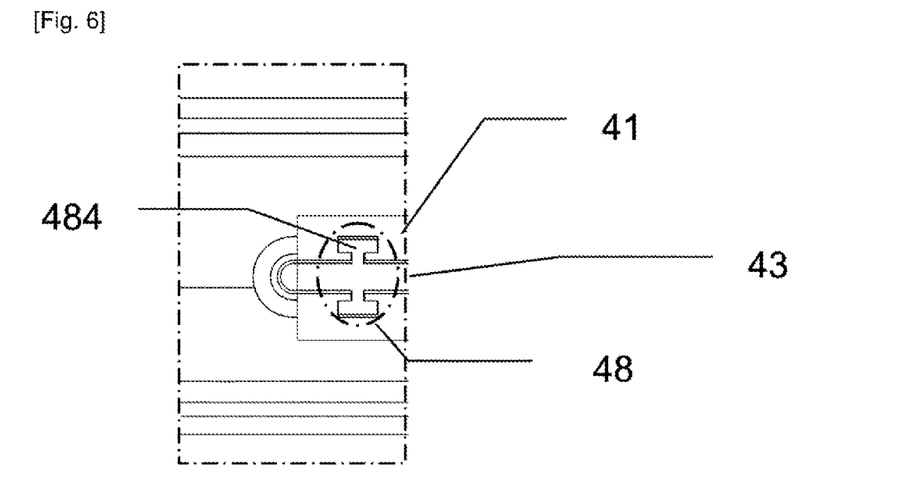
FIG. 6 shows another particular implementation of the bridging element of FIG. 2.
Figure 7:
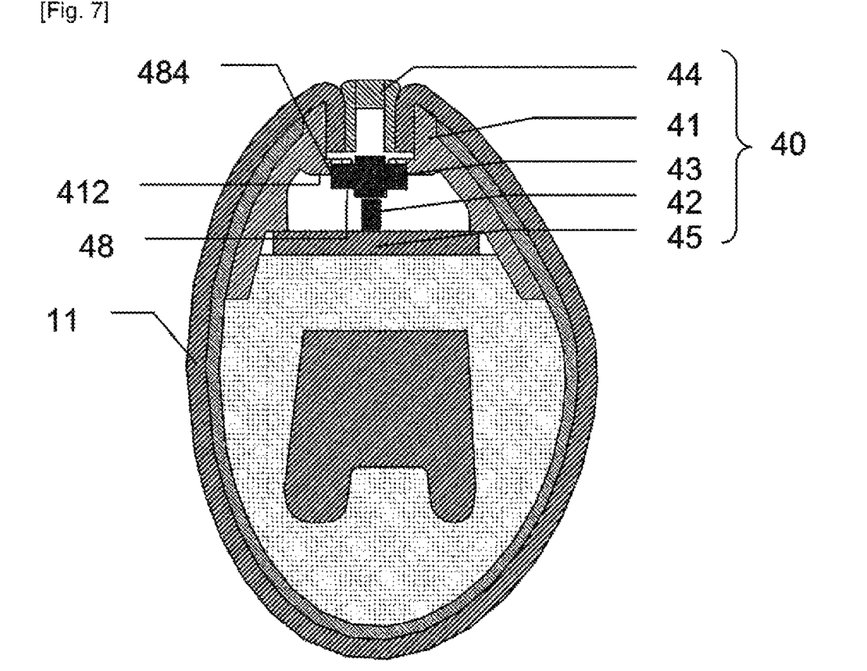
FIG. 7 shows the cross-section of FIG. 3, with the implementation of the bridging element of FIG. 6.

FIGS. 6 and 7 show another alternative of the bridging element 48, with here a connection provided by male parts 484 formed on the light guide 43, and engaged in counter-forms of the holding body 41. In this example, the male parts 484 are Tees, and the counter shapes of the holding body are Tee grooves. However, other shapes can be provided, such as for example a dovetail.

Figure 8:
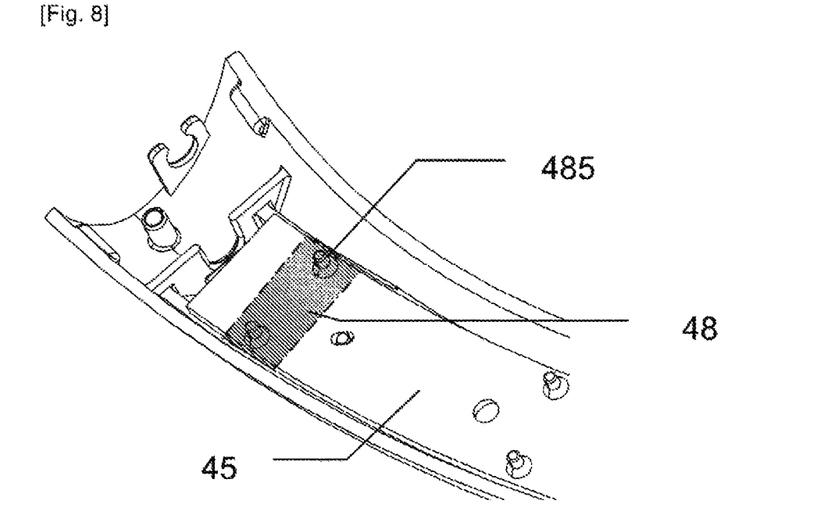
FIG. 8 shows another particular implementation of the bridging element in the device of FIG. 2.

FIG. 8 shows an alternative wherein the bridging element 48 is formed on and by the printed circuit 45 (the light sources 42 are not visible because the printed circuit is seen from below), on which pins 485 are provided. The pins 485 have a length calculated to engage in the printed circuit 45, and in the internal wall 412 (hidden by the printed circuit 45). The pins 485 can be deformed, soldered or attached in any way to the printed circuit 45, and it is possible to provide them in the same way on the internal wall 412, or to provide them in the same material and in one piece (the holding body 41 is then formed by moulding directly with the pins 485). In FIG. 8, the hatched area represents the bridging element 48 and in particular its connecting portion that is opposite the elongate opening 411. The light sources 42 are therefore arranged between the connecting portion and the elongate opening, the connecting portion can therefore be opaque, since it is opposite the user relative to the light sources 42. Advantageously, the pins 485 are formed in the holding body 41 in the vicinity of the elongate opening 411.

Figure 9:
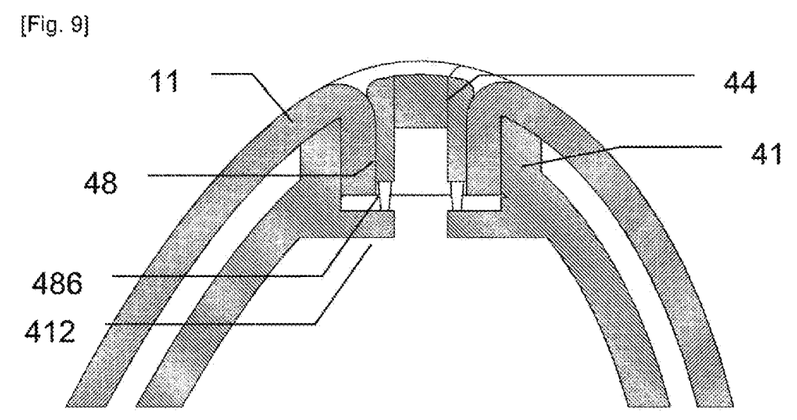
FIG. 9 shows another particular implementation of the bridging element in the device of FIG. 2.

FIG. 9 shows an alternative wherein the bridging element 48 is formed by a portion of the diffuser 44. Indeed, the diffuser 44 is in the shape of a U inserted upside down in the groove formed by the holding body 41 and the flaps of the sheath 11, and comprises protuberances 486 allowing for example ultrasonic welding on the internal wall 412. It is also possible to envisage clipping in the internal wall 412 for example. Thus, the diffuser 44, at the protuberances 486, is perfectly anchored on either side of the elongate opening, so that the holding body 41 is reinforced by the bridging element 48.

Figure 10:
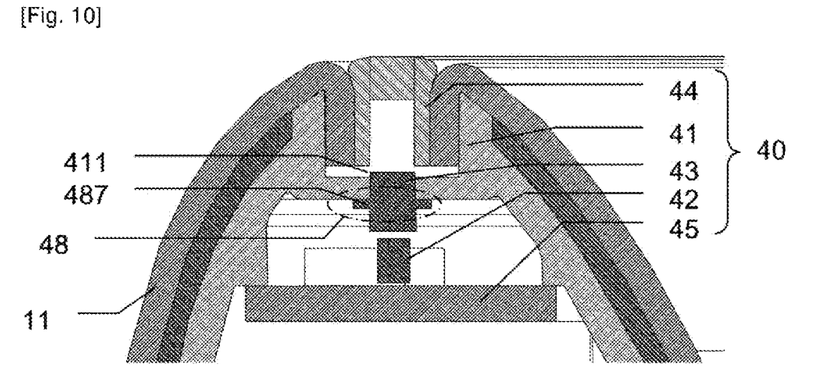
FIG. 10 shows another particular implementation of the bridging element in the device of FIG. 2.

FIG. 10 shows a last alternative of the bridging element 48, which is formed by a central part of the light guide 43, the latter being directly overmolded on the holding body 41 and connected by two overmolded parts 487, each overmolded on an edge of the elongate opening 411. An alternative could consist of overmolding the holding body 41 on the light guide 43.

In all embodiments, the bridging element 48 provides a connection between two edges of the elongate opening 411, to ensure the width thereof and to prevent it from opening or separating. Such a bridging element 48 can be provided at regular intervals along the elongate opening 411, such as for example every 20 mm or every 5° or 10° of angular sector centered on the axis of rotation of the steering wheel in front view as in FIG. 1.

In any case, the bridging element avoids providing a transverse groove on the groove that could cause variations in luminosity or display appearance.

It will be understood that various modifications and/or improvements which are obvious to a person skilled in the art may be made to the different embodiments of the invention described in the present description without departing from the scope of the invention. In particular, it may be noted that the bridging element and/or the lighting device can be completely assembled before its integration onto the rim of the steering wheel. It may also be noted that the bridging element may or must be assembled from an inner side of the rim, that is, from below in FIG. 3, 7, 10, which leaves access through the top. It may also be noted that the bridging modes can be combined, a single bridging element may have on the one hand a bridging to be welded or headed, and on the other hand, a bridging which only makes it engage in a counter-form. It is also possible to have several bridging elements which each take place on the holding body, or between them, which makes it possible to reinforce the holding body (41).

The invention claimed is:

1. A lighting device for a vehicle steering wheel rim, comprising:
   a plurality of light sources arranged so as to emit light towards an external display wall of the rim
   a holding body comprising an internal wall with an elongate opening having a predetermined passage width to allow the light emitted towards the external display wall to pass through,
   characterized in that the lighting device comprises at least one bridging element engaged with the holding body and at least partially arranged on a side of the internal wall opposite from the external display wall, in order to limit any increase in the predetermined passage width.

2. The lighting device according to claim 1, wherein the bridging element comprises a connecting portion opposite the elongate opening, and wherein at least one light source is arranged between the bridging element and the elongate opening.

3. The lighting device according to claim 1, wherein the bridging element has a connecting portion opposite the elongate opening, wherein the connecting portion is arranged opposite at least one light source,
   wherein:
   the connecting portion is arranged between said light source and the external display wall, and the connecting portion is transparent,
   or wherein:
   said light source is arranged between the external display wall and the connecting portion, and the connecting portion is opaque.

4. The lighting device according to claim 1, comprising a printed circuit supporting the plurality of light sources, wherein the bridging element is formed by the printed circuit.

5. The lighting device according to claim 1, comprising a light screen or diffuser forming the external display wall, wherein the bridging element is formed by the light screen or diffuser.

6. The lighting device according to claim 1, the rim comprising an outer sheath, wherein the bridging element is engaged with the holding body in a sheath-free zone.

7. The lighting device according to claim 1, wherein the elongate opening has a passage length, and wherein the holding body is free of stiffening rib in the passage length direction.

8. The lighting device according to claim 1, wherein the elongate opening is continuous and/or wherein the holding body is free of ribs or bars transverse to the elongate opening and/or opposite the elongate opening.

9. The lighting device according to claim 1, wherein at least one of the holding body or the bridging element comprises a protrusion passing through a wall of the other of the holding body or the bridging element.

10. The lighting device according to claim 1, wherein at least one of the holding body or the bridging element comprises a portion welded on the other of the holding body or the bridging element.

11. The lighting device according to claim 1, wherein at least one of the holding body or the bridging element comprises a portion embedded in the other of the holding body or the bridging element.

12. The lighting device according to claim 1, wherein at least one of the holding body or the bridging element comprises a portion plastically deformed, and/or plastically folded, and/or headed to the other of the holding body or the bridging element.

13. The lighting device according to claim 1, wherein at least one of the holding body or the bridging element comprises a portion overmolded on the other of the holding body or the bridging element.

14. The lighting device according to claim 1 in combination with a vehicle steering wheel.

15. The lighting device according to claim 1 in combination with a motor vehicle.

* * * * *